(12) United States Patent
Chang et al.

(10) Patent No.: US 9,017,635 B2
(45) Date of Patent: Apr. 28, 2015

(54) CONTINUOUS MANUFACTURING APPARATUS AND METHOD FOR CARBON NANOTUBES HAVING GAS SEPARATION UNITS

(75) Inventors: Kwang-Hyun Chang, Daejeon (KR); Jin-Do Kim, Daejeon (KR); Kwang-Woo Yoon, Suwon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/980,297

(22) PCT Filed: Aug. 25, 2011

(86) PCT No.: PCT/KR2011/006272
§ 371 (c)(1),
(2), (4) Date: Jul. 17, 2013

(87) PCT Pub. No.: WO2012/138018
PCT Pub. Date: Oct. 11, 2012

(65) Prior Publication Data
US 2013/0302238 A1    Nov. 14, 2013

(30) Foreign Application Priority Data

Apr. 5, 2011 (KR) .......... 10-2011-0030941

(51) Int. Cl.
| | | |
|---|---|---|
| C01B 31/02 | (2006.01) |
| B01D 53/04 | (2006.01) |
| B01J 8/00 | (2006.01) |
| B01J 8/02 | (2006.01) |
| B01J 8/24 | (2006.01) |

(Continued)

(52) U.S. Cl.
CPC ............. *B01D 53/04* (2013.01); *B01J 8/0055* (2013.01); *B01J 8/006* (2013.01); *B01J 8/025* (2013.01);

(Continued)

(58) Field of Classification Search
CPC .......... B01J 8/0055; B01J 8/006; B01J 8/025; B01J 8/24; B01J 2208/00274; B01J 2208/0053; B01J 2208/00548; B01J 2208/00176; B01D 53/04; C01B 31/024
USPC ........ 423/447.1–447.3, 445 B; 977/742–754, 977/842–848; 422/187, 139
See application file for complete search history.

(56) References Cited

U.S. PATENT DOCUMENTS

2008/0274277 A1* 11/2008 Rashidi et al. ............. 427/249.1

FOREIGN PATENT DOCUMENTS

| | | |
|---|---|---|
| EP | 1837306 A1 | 9/2007 |
| JP | 2004-076197 | 3/2004 |

(Continued)

OTHER PUBLICATIONS

Phair, et al. "Materials for Separation Membrane in Hydrogen and Oxygen production and Future Power Generation"; Science and Technology of Advanced Materials, Dec. 2006, vol. 7, pp. 792-805.

*Primary Examiner* — Daniel C McCracken
(74) *Attorney, Agent, or Firm* — McKenna Long & Aldridge, LLP

(57) ABSTRACT

The present invention relates to a continuous manufacturing apparatus for a carbon nanotube having gas separation units and a continuous manufacturing method for a carbon nanotube using the same. According to the present invention, the present invention has an effect to provide the continuous manufacturing apparatus of the carbon nanotube and continuous manufacturing method using the same, in which it makes possible to perform a rapid processing; has excellent productivity and excellent conversion rate of carbon source; can significantly reduce the cost of production; can reduce energy consumption because a reactor size can be decreased as compared with capacity; and a gas separation unit that not generate a waste gas.

5 Claims, 1 Drawing Sheet

(51) Int. Cl.
 *B82Y 30/00* (2011.01)
 *B82Y 40/00* (2011.01)
(52) U.S. Cl.
 CPC .......... *B01J 8/24* (2013.01); *B01J 2208/00176* (2013.01); *B01J 2208/00274* (2013.01); *B01J 2208/0053* (2013.01); *B01J 2208/00548* (2013.01); *C01B 31/024* (2013.01); *B82Y 30/00* (2013.01); *B82Y 40/00* (2013.01); *Y10S 977/843* (2013.01)

(56) References Cited

FOREIGN PATENT DOCUMENTS

| | | |
|---|---|---|
| JP | 2009-007237 | 1/2009 |
| KR | 2002-0015749 A | 3/2002 |
| KR | 1020120112918 A | 10/2012 |
| WO | 2005/054124 A1 | 6/2005 |
| WO | 2007/141558 A2 | 12/2007 |

\* cited by examiner

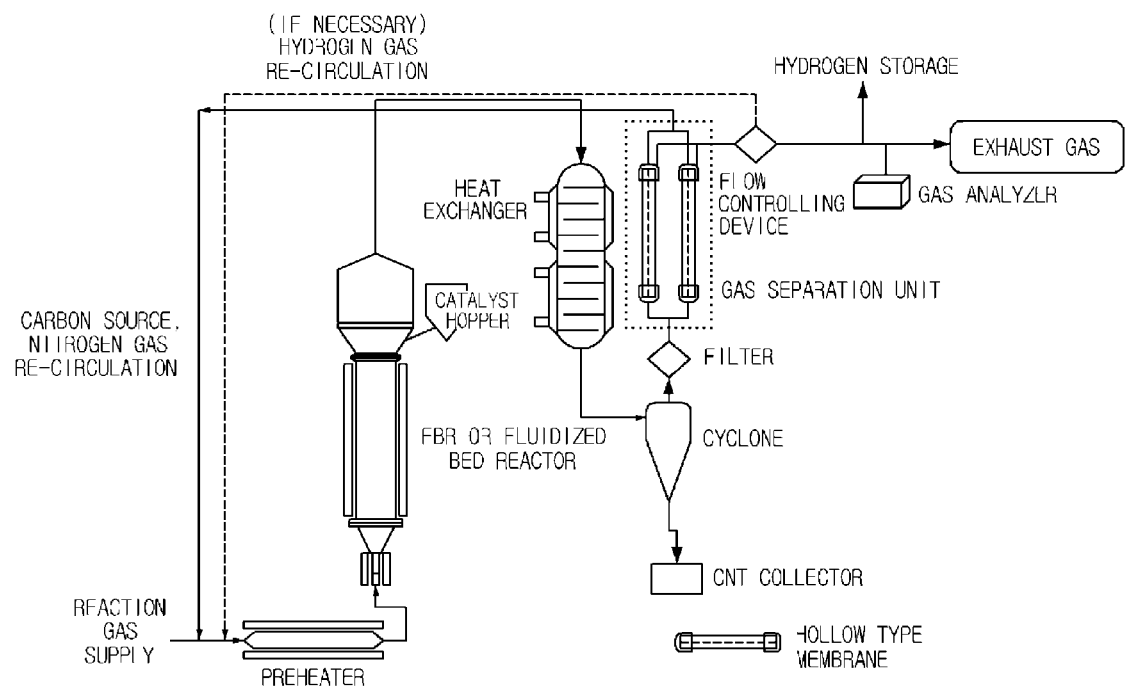

CONTINUOUS MANUFACTURING APPARATUS AND METHOD FOR CARBON NANOTUBES HAVING GAS SEPARATION UNITS

This application is a National Stage Entry of International Application No. PCT/KR2011/006272, filed Aug. 25, 2011, and claims the benefit of Korean Application No. 10-2011-0030941, filed on Apr. 5, 2011, which are hereby incorporated by reference in their entirety for all purposes as if fully set forth herein.

TECHNICAL FIELD

The present invention relates to a continuous manufacturing apparatus for a carbon nanotube having gas separation units and a continuous manufacturing method for a carbon nanotube using the same, and more specifically, to a continuous manufacturing apparatus for a carbon nanotube having gas separation units and a continuous manufacturing method for a carbon nanotube using the same, in which the apparatus is possible to perform a rapid processing; has excellent productivity and excellent conversion rate of carbon source; can significantly reduce the cost of production; can reduce energy consumption because a reactor size can be decreased as compared with capacity; and is an environmentally friendly apparatus so that waste gas is not generated.

BACKGROUND ART

A carbon nanotube (hereinafter, referred as to 'CNT' is understood that it is a cylindrical carbon nanotube having a diameter of 3 to 150 nm, preferably 3 to 100 nm, and a length of several times, i.e., at least 100 times as long as its diameter. The tube is consisted of aligned carbon atom layers and has cores of different types. The carbon nanotube is also called as a carbon fibril or a hollow carbon fiber. The carbon nanotube disclosed in the present invention is industrially important in the production of composite because of the size and specific properties of the carbon nanotube. It has an essential additional possibility in an electronic application, an energy application, and an additional application.

The carbon nanotube is generally manufactured by an arc discharge, a laser ablation, a chemical vapor deposition, etc. However, the arc discharge and laser ablation are difficult to perform a bulk production, and also the over cost of arc production and purchase cost of laser apparatus are problem.

Furthermore, the chemical vapor deposition has problems in that a synthesize velocity is very slow and CNT particles that are synthesized are too small in the case of using a gas-phase dispersion catalyst and there is a limit to the bulk production of CNT because a space use efficiency inside the reactor is significantly reduced in the case of using a substrate-supported catalyst.

It has been disclosed that a rotary kiln way for producing CNT is performed by injecting a hydrocarbon-based reaction gas after injecting a catalyst into a reactor of rotating drum type and a method for using a fluidized bed reactor for synthesizing CNT is performed by forming the fluidized bed, in which a fluidized medium in a state of heating is flow, and then synthesizing CNT in the fluidized bed as a bulk production method of CNT.

However, the rotary kiln way and the method for using the fluidized bed reactor have a limit on productivity thereby having maximum 80% level of conversion rate of carbon source and a problem in that a large dose of carbon dioxide, and the like is emitted due to an incineration of waste gas.

At this time, the incineration is to dispose an un-reacted carbon source raw material gas, $H_2$ produced from the reaction, and $N_2$, Ar, and the like that are an inert gas injected for a processing stability by using a conventional discharge gas combustion column (Flare Stack) and an incinerator, and also in order to perform the incineration, the cost related to $H_2$ and $N_2$ should be also considered because an excess $H_2$ should be injected in at least the same with the amount of hydrocarbon as much as hydrocarbon that is a component of carbon nanotube.

In addition, a capital investment due to a large-scale apparatus and more than 4 columns due to a non-continuous adsorption and desorption processing should be required in the case of a cryogenic distillation and PSA (pressure swing adsorption) that are a gas separation type used for producing $N_2$ and $H_2$ and a conventional petrochemical processing. Furthermore, refrigeration equipments should be required for reducing a temperature to the temperature of liquefaction in the case of the cryogenic distillation. Accordingly, the reduction of operational costs and simplification of processing can be possible when $H_2$ can be selectively removed without the capital investments of large-scale equipments as mentioned above.

DISCLOSURE OF INVENTION

Technical Problem

An object of the present invention is to provide a continuous manufacturing apparatus for a carbon nanotube having gas separation units and a continuous manufacturing method for a carbon nanotube using the same, in which the apparatus is possible to perform a rapid processing; has excellent productivity and excellent conversion rate of carbon source; can significantly reduce the cost of production; can reduce energy consumption because a reactor size can be decreased as compared with capacity; and has the gas separation units that not generate a waste gas, in order to solve the problems of prior art as mentioned above.

Solution to Problem

In order to achieve the above object, the present invention provides a continuous manufacturing apparatus for a carbon nanotube, including i) a reactor for synthesizing a carbon nanotube; ii) a separator for separating a mixed gas from the carbon nanotube that is transferred from the reactor; iii) a gas separation unit including more than one polymer membrane that removes in whole or in part of more than one component gas from the separated mixed gas; and iv) a recirculation pipe for recirculating the mixed gas removed in whole or in part of the component gas to the reactor for the carbon nanotube.

Furthermore, the present invention provides a continuous manufacturing method for the carbon nanotube, including i) synthesizing the carbon nanotube by reacting a catalyst and a reaction gas including a carbon source, a reducing gas, and an inert gas; ii) separating a mixed gas that is discharged along with the synthesized carbon nanotube; iii) removing the reducing gas of the amount produced in a above step i) by filtrating the separated mixed gas with the gas separation unit including more than one polymer membrane; and iv) recirculating the mixed gas removed in whole or in part of the reducing gas to the above step i).

Hereinafter, the present invention will be described in detail.

A continuous manufacturing apparatus for a carbon nanotube according to the present invention includes i) a reactor for synthesizing a carbon nanotube; ii) a separator for separating a mixed gas from the carbon nanotube that is transferred from the reactor; iii) a gas separation unit including more than one polymer membrane that removes in whole or in part of more than one component gas from the separated mixed gas; and iv) a re-circulation pipe for recirculating the mixed gas removed in whole or in part of the component gas to the reactor for the carbon nanotube.

The carbon nanotube reactor i) may be a chemical vapor deposition reactor, preferably a fluidized bed reactor (hereinafter, referred as to 'FBR', a fixed bed reactor, or a rotary reactor, more preferably a rotary kiln type reactor or the fluidized bed reactor, and still more preferably the fluidized bed reactor (FBR reactor). At this time, the fluidized bed reactor has effects in that the productivity is excellent and the bulk production of CNT is easily performed as compared with the volume of reactor, and also both the continuous and batch type operations are possible.

The fluidized bed reactor is preferably to produce CNT by contact-reacting with a catalyst injected to the reactor through a catalyst gas supplier in the upper part of the reactor, after sending from the bottom part of the reactor to the upper part of the reactor after preheating at about 200 to 500° C. through a preheater through a reaction gas supplier of a carbon source, a reducing gas, an inert gas, etc.

The reaction gas supplier is not specifically limited if it can generally be used in CNT manufacturing apparatus, and specifically it may be a gas distributor, etc. As mentioned above, it is preferable in the terms of reaction efficiency that the supplying pipe for supplying the preheated reaction gas to the reactor may be a type of gas distributor in the case of using the preheater.

The catalyst supplier is not specifically limited if it can be generally used in CNT manufacturing apparatus, and specifically it may be a type of hopper.

A catalyst activated component of the catalyst often has an oxide type, a part or completely reduced type, or a hydroxide type, and generally may be a supported catalyst, a co-precipitation catalyst, etc. The supported catalyst among these is preferably used because when using the supported catalyst, the bulk density of catalyst itself is higher than that of the co-precipitation catalyst; it can be decreased that a possibility for generating fine powders due to an attraction that can be generated in a fluidizing process because there is a small amount of fine powder that is less than 10 micron unlike the co-precipitation catalyst; and there is an effect on safely operating the reactor because the mechanical strength of catalyst itself is excellent.

In the case of using the co-precipitation catalyst as the preferable catalyst type, there are advantages in that the method for producing the catalyst is simple; it is of advantage in the terms of production cost because the costs of metallic salts that are preferable for the catalyst raw materials are low; and a specific surface area is wide so that the activity of catalyst is high.

The catalyst may be preferably a heterogeneous catalyst, of which a activated metal is more than two species.

The inert gas may be $N_2$, Ar, etc.

For example, when using the fluidized bed reactor, the operating way may be as follows: the fluidized bed is formed inside the reactor; the reaction is performed by contacting the catalyst with the reaction gas in the fluidized bed; and CNT is grown on the activated metal of the catalyst as the reaction progressed so that a bulk density of product is low thereby discharging outside the reactor.

The bulk density may be 0.03 to 0.3 g/cm$^3$, and preferably 0.01 to 0.1 g/cm$^3$.

The fluidization velocity of the fluidized bed formed in the fluidized bed reactor is preferably 0.03 to 30 cm/s, and more preferably 0.1 to 25 cm/s.

The minimum fluidization velocity of the fluidized bed in the fluidized bed reactor is preferably 0.03 to 15 cm/s, and more preferably 1 to 10 cm/s.

The reactor may be connected to a catalyst supplier for supplying the catalyst; a reaction gas supplying pipe for supplying a carbon source, a reducing gas, and an inert gas; or a reaction gas supplier, in which the reaction gas is preheated through the preheater; and a discharging pipe for discharging the mixed gas including the produced carbon nanotube and a reaction byproduct gas.

The carbon source is a carbon-containing gas that can be degraded in the state of heating, and for example aliphatic and olefin, alcohol, carbon oxide, especially CO, an aromatic compound with or without heteroatom, and a functionalized hydrocarbon, the mixture thereof, the reactant thereof, etc. A specific example may be one or more selected from the group consisting of methane, ethane, propane, butane, pentane, hexane, ethylene, propylene, butene, butadiene, short-chain and middle-chain aliphatic or olefin hydrocarbon having 1, or 2 to 10 numbers of carbon, respectively, 1-nucleus or 2-nucleus aromatic hydrocarbon, aliphatic ($C_xH_{2x+2}$) and olefin ($C_xH_y$) having x that is a 1 to 4 or 2 to 4 number of carbon, respectively. More specific example may be methane, ethane, ethylene, acetylene, ethanol, methanol, acetone, carbon monoxide, propane, benzene, cyclohexane, propylene, butane, isobutene, toluene, xylene, cumene, ethylbenzene, naphthalene, phenanthrene, anthracene, acetylene, formaldehyde, acetaldehyde, etc, and preferably, methane ($CH_4$), ethane ($C_2H_6$), carbon monoxide (CO), acetylene ($C_2H_2$), ethylene ($C_2H_4$), propylene ($C_3H_6$), butane ($C_4H_{10}$) and liquefied petroleum gas (LPG) that is a mixture.

The separator ii) is not specifically limited if it is a mean, an equipment, or an apparatus capable of separating the mixed gas from CNT, but preferably may be a cyclone.

The gas separation unit iii) may be a polymer membrane for separating the un-reacted carbon source, a part of reducing gas, and the inert gas from the mixed gas discharged from the separator and then transferring a selectively required amount to the recirculation pipe.

Specifically, the polymer membrane is a type of hollow tube, and can be used by connecting in parallel or series of more than one membrane. When using 1 to 40 membranes among these, it has a useful effect on controlling a continuous process, an adsorption and desorption, a recirculation supplied composition, etc. A single membrane can be possible to separate effectively through controlling a pressure and supplying amount when the polymer membrane itself has high separation efficiency.

In addition, as defined in the following Examples, a material of the polymer membrane is preferably a polymer material, such as polysulfone, polycarbonate, polyimide, and polystyrene that are possible to operate at low temperature, especially for separating hydrogen.

For the gas separation unit iii), the reducing gas to be separated is sent to a side stream on the polymer membrane as mentioned above, and the rest of the gas components, i.e., the un-reacted carbon source, a part of the reducing gas and the inert gas is re-circulated to the inject line of the reactor, and if necessary, it is possible to additionally re-circulate (see FIG. 1).

In addition, the gas separated from the polymer membrane may be distributed by using a flow control apparatus, such as a valve that can control the flow distribution, but is not limited thereto.

The reducing gas may be hydrogen.

For reference, it have been confirmed that inputs of ethylene, hydrogen, and nitrogen could be reduced by 20 to 30%, 99% and 98%, as compared with an output of CNT, respectively when the temperature is reduced by passing CNT particles and mixed gas produced in the reactor through a heat exchanger; the CNT particles and mixed gas are separated by using a cyclone, and then the CNT particles are sent to a collector to collect; and the mixed gas is re-circulated after passing through the gas separation unit.

For the specific gas discharged from the gas separation unit, if necessary, especially if the filtrated mixed gas lacks the specific gas, the part of it may be supplied to a re-circulation pipe or reaction gas supply pipe.

The un-reacted carbon source that is included in the mixed gas may be preferably controlled in 2 to 30% of the carbon source supplied to the reactor, and more preferably 5 to 20%.

A catalyst and the carbon source consumed in the reactor are only injected to the CNT manufacturing apparatus, which can be possible to ideally operate the process to always have very similar composition rate and amount.

The CNT manufacturing apparatus can selectively re-circulate the mixed gas including the un-reacted carbon source, the inert gas, the byproduct gas, and the like that are usually discharged or incinerated by using the conventional discharge gas combustion column, the incinerator, and the like to secure at least 98% of carbon source conversion rate without an additional injection of the inert gas. Accordingly, the CNT manufacturing apparatus can significantly reduce the cost of CNT production and not requires the incineration so that it is an environmentally friendly process because there is no problem in that carbon dioxide is not released to the atmosphere.

In addition, the CNT manufacturing apparatus can significantly decrease the size of fluidized bed as compared with the capacity of low-energy consumption equipment so that the cost of energy of the fluidized bed reactor, which can be operated at 800 to 1000° C., can be significantly decreased.

For the CNT manufacturing apparatus, the heat exchanger may be connected between the reactor and the separator or between the separator and CNT collector, and more preferably it may be connected between the reactor and the separator.

Especially, the mixed gas and CNT that are discharged after cooling at 40 to 50° C. through the heat exchanger are separated through the separator in order to secure the temperature of less than 50° C. that is the range capable of operating the polymer membrane for a low-temperature.

The arrangement between the reactor and the separator means that contains the inside of the reactor and a filter may be arranged in a expander part of the fluidized bed reactor along with the heat exchanger.

When the reactor is designed to collect CNT synthesized in the reactor at the bottom part of the reactor, the filter may be installed inside the reaction apparatus for removing the fine powders contained in the mixed gas that is discharged at the upper part, and also when the heat exchanger is inside the reaction apparatus, the separator, such as the cyclone, may be arranged inside the reaction apparatus.

The component gas of the iii) may be the byproduct gas produced in the reactor i).

The continuous CNT manufacturing apparatus preferably includes further a control mean for controlling the amount of the reaction gas supplied to the reactor and the amount of component gas removed in the gas separation unit.

The control mean may be to control the amount of the reducing gas supplied to the reactor and the amount of the reducing gas passed through the gas separation unit.

The control mean may be to control corresponding to the amount of the reducing gas supplied to the reactor with the amount of the reducing gas passed through the gas separation unit.

The continuous CNT manufacturing apparatus preferably includes further CNT screening device of filter or scrubber type between the separator ii) and the gas separation unit iii).

The filter in the CNT screening device can collect CNT particles remained in the mixed gas separated by the separator, and the scrubber can remove harmful material, such as halide, that is present in the mixed gas separated by the separator. At this time, the CNT screening device may collect only CNT aggregate that is larger than the fixed minimum diameter, especially, 1 μm, and preferably uses the filter.

For the continuous CNT manufacturing apparatus, as a concrete example, an output of CNT is preferably more than 100 MT (Metric Ton)/year, and in this situation, a large amount of inert gas is required, and also the reducing gas should be injected in the same amount as the carbon source or more so that it has very big effect on reducing the production cost.

The continuous CNT manufacturing apparatus may not have an incineration mean of waste gas, such as a discharge gas combustion column or an incinerator. For reference, the treatment of waste gas as shown in FIG. 1 may mean the selectively treatment of hydrogen separated for purifying to a high purity hydrogen through an additional separation process in view of the economic feasibility, but is not limited thereto, and the hydrogen itself without the additional separation process can be also used as a fuel gas.

The continuous CNT manufacturing method according to the present invention includes i) synthesizing CNT by reacting a catalyst and a reaction gas including a carbon source, a reducing gas, and an inert gas; ii) separating a mixed gas that is discharged along with the synthesized CNT; iii) removing a part or whole of the reducing gas by filtrating the separated mixed gas with the gas separation unit including more than one polymer membrane; and iv) recirculating the mixed gas removed in whole or in part of the reducing gas to the above step i).

The amount of reducing gas that is removed in the iii) is preferably corresponded with the amount produced in the reaction of i).

The mole rate of the carbon source and the reducing gas may be preferably 1:0.5 to 1:10, more preferably 1:0.9 to 1:6, and most preferably 1:1 to 1:5 and it is effective in increasing the production of graphitic carbon by suppressing the production of amorphous carbon through controlling the production velocity of carbon nanotube in the above range.

For the step for producing CNT of the i), if necessary, more than one selected from the group consisting of water, ammonia, NO, NO2, and the like can be further injected. The content used is enough about 3 wt % as compared with total input, but is not limited thereto.

As a specific example, the catalyst may be produced by dissolving $Co(NO_3)_2$-$6H_2O$, $(NH_4)_6Mo_7O_{24}$-$4H_2O$, $Fe(NO_3)_2$-$6H_2O$, $Ni(NO_3)_2$-$6H_2O$, and the like in a distilled water, and then wet impregnating or treating with ultrasonic waves along with $Al(OH)_3$, $Mg(NO_3)_2$, colloidal silica, etc.

In addition, the catalyst may be produced by using a sol-gel method using a chelating agent, such as citric acid, ethylenediaminetetraaceticacid (EDTA) etc, to smoothly dissolve catalyst active metal precursor, or may be produced by co-precipitating the catalyst active metal precursor.

The filtration of the iii) may be performed by using the polymer membrane as mentioned above in order to selectively separate the mixed gas.

The reducing gas may be preferably hydrogen.

The steps of the iii) and iv) may be more preferably performed as the step for recirculating to the step i) through the re-circulation pipe after separating the un-reacted carbon source, a part of reducing gas, and inert gas (for example, $N_2$, and other inert gas, a part of $H_2$, un-reacted carbon source, etc) by using the polymer membrane from the mixed gas separated so that the inputs of ethylene, hydrogen, and nitrogen are reduced by 20 to 30%, 99%, and 98%, as compared with CNT output, respectively.

At this time, as established in the following Examples 12 to 16, when all the reducing gas produced in the reaction can be not separated, it may further include the step for additionally recirculating the selectively required amount of remained $H_2$ gas to the step i) through the re-circulation pipe in the view of the separation efficiency.

The continuous CNT manufacturing method may further include the step for injecting the consumed amount in the reaction i) to the mixed gas filtered of iv).

The continuous CNT manufacturing method has an advantage in that the step for incinerating waste gas can be excluded.

According to the present invention, the carbon nanotube produced has an external diameter of 3 to 100 nm, but is not limited thereto.

Advantageous Effects of Invention

As shown in the above, the present invention has an effect on providing a continuous manufacturing apparatus for a carbon nanotube having gas separation units and a continuous manufacturing method for a carbon nanotube using the same, in which the apparatus is possible to perform a rapid processing; has excellent productivity and excellent conversion rate of carbon source; can significantly reduce the cost of production by decreasing the consumption amount of the inflow gas, such as the carbon source, hydrogen, and nitrogen, etc; can reduce energy consumption because a reactor size can be decreased as compared with capacity; and has the gas separation unit that does not generate a waste gas.

BRIEF DESCRIPTION OF DRAWINGS

The above and other objects, features and advantages of the present invention will become apparent from the following description of preferred embodiments given in conjunction with the accompanying drawings, in which:

FIG. 1 is a process chart showing a specific example of a continuous CNT manufacturing apparatus according to the present invention.

BEST MODE FOR CARRYING OUT THE INVENTION

Hereinafter, preferable examples will be described in order to helping the under-standing of the present invention, but the following Examples are only for indicating the present invention, and the spirit of the present invention is not limited thereto.

Furthermore, a specific example of the continuous CNT manufacturing apparatus according to the present invention is roughly shown in FIG. 1. FIG. 1 only shows device required for describing the present invention, and other definite devices, including any pump, an additional valve, any pipe etc, that are required for performing the present method are omitted.

EXAMPLES

Example 1

Production of CNT Catalyst

Flask A including 37.039 g of $Co(NO_3)_2$-$6H_2O$ dissolved in 200 ml of aqueous solution and Flask B including 32.30 g of $(NH_4)_6Mo_7O_{24}$-$4H_2O$ dissolved in 200 ml of aqueous solution were prepared to add to Flask C including 50 g of $Al_2O_3$ (D50=76 micron, pore volume: 0.64 $cm^3$/g, surface area: 237 $m^2$/g, the product available from Saint Gobain Company), and then stirred for at least 60 minutes to sufficiently support a catalyst active metal precursor into $Al_2O_3$. And then, it was vacuum-filtered by using 10 micron filter paper or 4× glass filter to separate a filter cake supported with the catalyst active metal precursor and then washed with a distilled water to collect. The filter cake collected was dried for 24 hours at a oven of 120° C. The dried catalyst was fired for 3 hours at 600° C. to produce the catalyst.

<Production of CNT>

As shown in FIG. 1, 5 g of the CNT catalyst was supplied inside the reactor through a catalyst gas supplier connected to the upper part of a vertical fluidized bed reactor having a diameter of 55 mm and a height of 1 m to fill 5 g of the catalyst inside the reactor, and then a reaction gas ($C_2H_4$:$H_2$:$N_2$=1:1:1) was injected to the reactor in a velocity of 3000 ml/min through a reaction gas supply pipe connected to the bottom part of the reactor, provided that it was injected after increasing the temperature to 500° C. through a preheater, to synthesize CNT for 1 hour at 800° C.

The reaction was performed by selectively separating 50% out of a hydrogen gas discharged in a mixed gas (un-reacted carbon source $C_2H_4$, inert gas $N_2$, initial injected reducing gas $H_2$, $H_2$ generated as the byproduct) separated from CNT product through a cyclone as a continuous reaction in two parallel connection polymer membranes (48 mm diameter, 27 inch length, hollow type polycarbonate membrane, the product available from IGS Company), and recirculating to the reaction gas supply pipe through the recirculation pipe passed through a flow control valve to produce CNT.

After 1 hour reaction, CNT collected to a CNT collector has a yield [(Weight of CNT collected Weight of Catalyst injected)/Weight of Catalyst injected×100] of 950% based on catalyst input, and at this time, the average external diameter of CNT obtained from the above was 30 nm.

Example 2

CNT was produced by using the same method with the above Example 1, except that the composition of the reaction gas in the above Example 1 was changed to $C_2H_4$:$H_2$:$N_2$=1:2:1 and 35% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 4.8% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 85% of initial amount injected to the reaction gas supply pipe.

After 1 hour reaction, CNT collected to the CNT collector has a yield of 1020% as compared with catalyst input, and at this time, the average external diameter of CNT obtained from the above was 30 nm.

Example 3

CNT was produced by using the same method with the above Example 1, except that the composition of the reaction gas in the above Example 1 was changed to $C_2H_4:H_2:N_2=1:3:1$ and 29% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 3.6% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 85% of initial amount injected to the reaction gas supply pipe.

After 1 hour reaction, CNT collected to the CNT collector has a yield of 780% as compared with catalyst input, and at this time, the average external diameter of CNT obtained from the above was 30 nm.

Example 4

CNT was produced by using the same method with the above Example 1, except that the composition of the reaction gas in the above Example 1 was changed to $C_2H_4:H_2:N_2=1:4:1$ and 24% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 3.3% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 83% of initial amount injected to the reaction gas supply pipe.

After 1 hour reaction, CNT collected to the CNT collector has a yield of 630% as compared with catalyst input, and at this time, the average external diameter of CNT obtained from the above was 30 nm.

Example 5

CNT was produced by using the same method with the above Example 1, except that the composition of the reaction gas in the above Example 1 was changed to $C_2H_4:H_2:N_2=1:5:1$ and 20% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 3.2% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 80% of initial amount injected to the reaction gas supply pipe.

After 1 hour reaction, CNT collected to the CNT collector has a yield of 580% as compared with catalyst input, and at this time, the average external diameter of CNT obtained from the above was 30 nm.

Example 6

3 g of the CNT catalyst produced from the above Example 1 was filled to 15 cm reaction module having a cylinder type, of which both sides connected to a rotary drum reactor having a diameter 55 mm and a height of 60 cm were produced with 10 micron mesh, and then supplied inside the reactor. The reaction gas ($C_2H_4:H_2:N_2=1:2:1$) was preheated at 500° C. through a preheater in a velocity of 1500 ml/min through the reaction gas supply pipe, and then injected to the above reactor. The reactor was tilted at an angle of 30 degree, and then rotated in a velocity of 30 rpm. The reaction was progressed for 1 hour at 800° C. to synthesize CNT.

The reaction was performed by selectively separating 36% out of a hydrogen gas discharged in the mixed gas (un-reacted carbon source $C_2H_4$, inert gas $N_2$, initial injected reducing gas $H_2$, $H_2$ generated as the byproduct) separated from CNT product through the cyclone as a continuous reaction in the polymer membrane that is a module of hollow type produced with polystyrene, and recirculating to the reaction gas supply pipe through the recirculation pipe passed through a flow distribution controller to produce CNT.

After 1 hour reaction, CNT collected to the CNT collector has a yield of 870% based on catalyst input, and at this time, the average external diameter of CNT obtained from the above was 30 nm.

Example 7

CNT was produced by using the same method with the above Example 6, except that the composition of the reaction gas in the above Example 6 was changed to $C_2H_4:H_2:N_2=1:3:1$ and 29% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 4.2% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 85% of initial amount injected to the reaction gas supply pipe.

After 1 hour reaction, CNT collected to the CNT collector has a yield of 700% as compared with catalyst input, and at this time, the average external diameter of CNT obtained from the above was 30 nm.

Example 8

Production of CNT Catalyst

Flask A including 37.039 g of $Co(NO_3)_2\cdot6H_2O$ dissolved in 300 ml of aqueous solution and Flask B including 32.30 g of $(NH_4)_6Mo_7O_{24}\cdot4H_2O$ dissolved in 300 ml of aqueous solution were prepared to add to Flask C including 50 g of MgO (Particle size: 44~106 micron, available from Aldrich Company), and then stirred for at least 60 minutes to sufficiently support a catalyst active metal precursor into $Al_2O_3$. And then, it was vacuum-filtered by using 10 micron filter paper to separate a filter cake and then washed with a distilled water to collect. The filter cake collected was dried for 24 hours at a oven of 120° C. The dried catalyst was fired for 3 hours at 600° C. to produce the CNT catalyst.

<Production of CNT>

5 g of the CNT catalyst was supplied inside the reactor through a catalyst gas supplier connected to the upper part of a vertical fluidized bed reactor having a diameter of 55 mm and a height of 1 m, and then a reaction gas ($C_2H_4$:$H_2$:$N_2$=1:2:1) was injected to the reactor in a velocity of 3000 ml/min through a reaction gas supply pipe connected to the bottom part of the reactor, provided that it was injected after increasing the temperature to 500° C. through a preheater, to synthesize CNT for 1 hour at 800° C.

The reaction was performed by selectively separating 34% out of a hydrogen gas discharged in a mixed gas (un-reacted carbon source $C_2H_4$, inert gas $N_2$, initial injected reducing gas $H_2$, $H_2$ generated as the byproduct) separated from CNT product through a cyclone as a continuous reaction in the polymer membrane that is a module of hollow type produced with polyimide, and recirculating to the reaction gas supply pipe through the recirculation pipe passed through a flow control valve to produce CNT.

After 1 hour reaction, CNT collected to a CNT collector has a yield of 1060% based on catalyst input, and at this time, the average external diameter of CNT obtained from the above was 25 nm.

Accordingly, the present invention allows realizing the process for continuously produce CNT by supplying only a shortage of ethylene without an additional supply of $H_2$ and $N_2$ out of the reaction gas components initially injected.

Example 9

CNT was produced by using the same method with the above Example 8, except that the composition of the reaction gas in the above Example 8 was changed to $C_2H_4$:$H_2$:$N_2$=1:3:1 and 29% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 3.8% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 84% of initial amount injected to the reaction gas supply pipe.

After 1 hour reaction, CNT collected to the CNT collector has a yield of 810% as compared with catalyst input, and at this time, the average external diameter of CNT obtained from the above was 25 nm.

Example 10

CNT was produced by using the same method with the above Example 8, except that the composition of the reaction gas in the above Example 8 was changed to $C_2H_4$:$H_2$:$N_2$=1:4:1 and 24% out of hydrogen gas in the mixed gas discharged from the reactor was selectively separated and discharged in the polymer membrane.

The reaction could be possible to safely operate by selectively removing only $H_2$ as the byproduct and recirculating the mixed gas consisting of the remained $H_2$, $N_2$, and 3.6% of un-reacted $C_2H_4$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 81% of initial amount injected to the reaction gas supply pipe.

After 1 hour reaction, CNT collected to the CNT collector has a yield of 670% as compared with catalyst input, and at this time, the average external diameter of CNT obtained from the above was 25 nm.

Example 11

3 g of the CNT catalyst produced from the above Example 8 was supplied inside the reactor through 15 cm reaction module having a cylinder type, of which both sides connected to a rotary drum reactor having a diameter 55 mm and a height of 60 cm were produced with 10 micron mesh. The reaction gas ($C_2H_4$:$H_2$:$N_2$=1:2:1) was injected to the reactor in a velocity of 1500 ml/min through the reaction gas supply pipe. The reactor was tilted at an angle of 30 degree, and then rotated in a velocity of 30 rpm. The reaction was progressed for 1 hour at 800° C. to synthesize CNT.

The reaction was performed by selectively separating 36% out of a hydrogen gas discharged in the mixed gas (un-reacted carbon source $C_2H_4$, inert gas $N_2$, initial injected reducing gas $H_2$, $H_2$ generated as the byproduct) separated from CNT product through the cyclone as a continuous reaction in two parallel connection polymer membranes (48 mm diameter, 27 inch length, hollow type polycarbonate membrane, the product available from IGS Company), and recirculating to the reaction gas supply pipe to produce CNT.

After 1 hour reaction, CNT collected to the CNT collector has a yield of 860% based on catalyst input, and at this time, the average external diameter of CNT obtained from the above was 25 nm.

Example 12

CNT was produced by using the same method with the above Example 11, except that the composition of the reaction gas in the above Example 11 was changed to $C_2H_4$:$H_2$:$N_2$=1:3:1 and 32% out of hydrogen gas in the mixed gas discharged from the reactor was selectively separated and discharged in the polymer membrane.

The reaction could be possible to safely operate by recirculating the mixed gas consisting of $H_2$, $N_2$, and 2.9% of un-reacted $C_2H_4$ to the reaction gas supply pipe and at the same time, selectively recirculating 3% of $H_2$ to the reaction gas supply pipe. In addition, the used amounts of H2 and N2 were minimized by reacting without an additional supply of $H_2$ and $N_2$ by performing a continuous operation through adding only $C_2H_4$ corresponding 88% of initial amount injected to the reaction gas supply pipe.

After 1 hour reaction, CNT collected to the CNT collector has a yield of 690% as compared with catalyst input, and at this time, the average external diameter of CNT obtained from the above was 25 nm.

Example 13

CNT was produced by using the same method with the above Example 11, except that the composition of the reaction gas in the above Example 11 was changed to $C_2H_4$:$H_2$:$N_2$=1:4:1 and 27% out of hydrogen gas in the mixed gas discharged from the reactor was selectively separated and discharged in the polymer membrane.

The reaction could be possible to safely operate by recirculating the mixed gas consisting of $H_2$, $N_2$, and 3.3% of un-reacted $C_2H_4$ to the reaction gas supply pipe and at the same time, selectively recirculating 3% of $H_2$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 83% of initial amount injected to the reaction gas supply pipe.

After 1 hour reaction, CNT collected to the CNT collector has a yield of 570% as compared with catalyst input, and at this time, the average external diameter of CNT obtained from the above was 25 nm.

Example 14

Production of CNT Catalyst

Flask A including 54.25 g of F $(NO_3)_2$-$6H_2O$ dissolved in 200 ml of aqueous solution and Flask B including 32.30 g of $(NH_4)_6Mo_7O_{24}$-$4H_2O$ dissolved in 200 ml of aqueous solution were prepared to add to 5 g of SiO2 (D50=55 micron, Surface area: 550 $m^2$/g, Merk 9385); vacuum-filtered by using 10 micron filter paper to separate a filter cake; and washed with a distilled water to collect. The filter cake collected was dried for 24 hours at a oven of 120° C. The dried catalyst was fired for 3 hours at 600° C. to produce the CNT catalyst.

<Production of CNT>

5 g of the CNT catalyst was initially supplied in a certain amount inside the reactor through a catalyst gas supplier connected to the upper part of a vertical fluidized bed reactor having a diameter of 55 mm and a height of 1 m, and then continuously supplied; a reaction gas ($C_2H_4$:$H_2$:$N_2$=1:2:1) was injected to the reactor from the bottom part of the reactor in a velocity of 3000 ml/min through a supply pipe, provided that it was injected after increasing the temperature to 500° C. through a preheater, to synthesize CNT for 1 hour at 800° C.

The reaction was performed by recirculating a filtered mixed gas (un-reacted carbon source $C_2H_4$, $N_2$ and $H_2$) including 31% out of a hydrogen gas discharged in a mixed gas (un-reacted carbon source $C_2H_4$, inert gas $N_2$, initial injected reducing gas $H_2$, $H_2$ generated as the byproduct) separated from CNT product through a cyclone as a continuous reaction through the polymer membrane (48 mm diameter, 27 inch length, hollow type polycarbonate membrane, the product available from IGS Company) through the re-circulation pipe, and at the same time selectively separating and circulating further 2% of hydrogen through the re-circulation pipe to the reaction gas supply pipe to produce CNT.

After 1 hour reaction, CNT collected to a CNT collector has a yield of 930% based on catalyst input, and at this time, the average external diameter of CNT obtained from the above was 25 nm.

From the result of analyzing by GC (Gas Chromatography) in the re-circulation pipe after selectively separating $H_2$, it could be known that the stable operation could be possible by only further supplying a shortage of ethylene without an additional supply of $H_2$ and $N_2$ out of the reaction gas components initially injected and CNT could be continuously produced.

Example 15

CNT was produced by using the same method with the above Example 14, except that the composition of the reaction gas in the above Example 14 was changed to $C_2H_4$:$H_2$:$N_2$=1:3:1 and 24% out of hydrogen gas in the mixed gas discharged from the reactor was selectively separated and discharged in the polymer membrane.

The reaction could be possible to safely operate by recirculating the mixed gas consisting of $H_2$, $N_2$, and 4.8% of un-reacted $C_2H_4$ to the reaction gas supply pipe and at the same time, selectively recirculating 3% of $H_2$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 80% of initial amount injected to the reaction gas supply pipe.

After 1 hour reaction, CNT collected to the CNT collector has a yield of 790% as compared with catalyst input, and at this time, the average external diameter of CNT obtained from the above was 25 nm.

Example 16

CNT was produced by using the same method with the above Example 14, except that the composition of the reaction gas in the above Example 14 was changed to $C_2H_4$:$H_2$:$N_2$=1:4:1 and 21% out of hydrogen gas in the mixed gas discharged from the reactor was selectively separated and discharged in the polymer membrane.

The reaction could be possible to safely operate by recirculating the mixed gas consisting of $H_2$, $N_2$, and 4.2% of un-reacted $C_2H_4$ to the reaction gas supply pipe and at the same time, selectively recirculating 2% of $H_2$ to the reaction gas supply pipe. In addition, the used amounts of $H_2$ and $N_2$ were minimized by reacting without an additional supply of $H_2$ and $N_2$ by performing a continuous operation through adding only $C_2H_4$ corresponding 78% of initial amount injected to the reaction gas supply pipe.

After 1 hour reaction, CNT collected to the CNT collector has a yield of 600% as compared with catalyst input, and at this time, the average external diameter of CNT obtained from the above was 25 nm.

Example 17

3 g of the CNT catalyst produced from the above Example 14 was supplied inside the reactor through 15 cm reaction module having a cylinder type, of which both sides connected to a rotary drum reactor having a diameter 55 mm and a height of 60 cm were produced with 10 micron mesh. The reaction gas ($C_2H_4$:$H_2$:$N_2$=1:2:1) was injected to the reactor in a velocity of 1500 ml/min through the reaction gas supply pipe after preheating at 500° C. The reactor was tilted at an angle of 30 degree, and then rotated in a velocity of 30 rpm. The reaction was progressed for 1 hour at 800° C. to synthesize CNT.

The reaction was performed by recirculating a filtered mixed gas (un-reacted carbon source $C_2H_4$, $N_2$ and $H_2$) including 35% out of a hydrogen gas discharged in a mixed gas (un-reacted carbon source $C_2H_4$, inert gas $N_2$, initial injected reducing gas $H_z$, $H_2$ generated as the byproduct) separated from CNT product through a cyclone as a continuous reaction through the hollow type polysolfone as the polymer membrane through the re-circulation pipe to the reaction gas supply pipe to produce CNT.

After 1 hour reaction, CNT collected to a CNT collector has a yield of 860% based on catalyst input, and at this time, the average external diameter of CNT obtained from the above was 25 nm.

Example 18

CNT was produced by using the same method with the above Example 17, except that the composition of the reaction gas in the above Example 17 was changed to $C_2H_4:H_2:N_2=1:3:1$ and 29% out of hydrogen gas in the mixed gas discharged from the reactor was selectively separated and discharged in the polymer membrane (48 mm diameter, 27 inch length, hollow type polycarbonate, the product available from IGS Company).

The reaction could be possible to safely operate by recirculating the mixed gas consisting of $H_2$, $N_2$, and 3.6% of un-reacted $C_2H_4$ to the reaction gas supply pipe. In addition, the used amounts of $H_2$ and $N_2$ were minimized by progressing the reaction without an additional supply of $H_2$ and $N_2$ by performing a continuous operation through adding only $C_2H_4$ corresponding 85% of initial amount injected to the reaction gas supply pipe.

After 1 hour reaction, CNT collected to the CNT collector has a yield of 680% as compared with catalyst input, and at this time, the average external diameter of CNT obtained from the above was 25 nm.

Example 19

CNT was produced by using the same method with the above Example 17, except that the catalyst produced from the above Example 14 in the above Example 17 was used; the composition of the reaction gas was changed to $C_2H_4:H_2:N_2=1:4:1$ and 24% out of hydrogen gas in the mixed gas discharged from the reactor was selectively separated and discharged in the polymer membrane.

The reaction could be possible to safely operate by recirculating the mixed gas consisting of $H_2$, $N_2$, and 3.5% of un-reacted $C_2H_4$ to the reaction gas supply pipe. In addition, the used amounts of $H_2$ and $N_2$ were minimized by progressing the reaction without an additional supply of $H_2$ and $N_2$ by performing a continuous operation through adding only $C_2H_4$ corresponding 85% of initial amount injected to the reaction gas supply pipe.

After 1 hour reaction, CNT collected to the CNT collector has a yield of 550% as compared with catalyst input, and at this time, the average external diameter of CNT obtained from the above was 25 nm.

The conversion rates of carbon sources in the above Examples 1 to 19 were at least 98%.

Example 20

In addition, 25 g of $Al_2O_3$ metal supported catalyst supported with 5 wt % of Mo and 15 wt % Co produced in a way as the above Example 1 was filled in the reactor. After preheating ethylene, nitrogen, and hydrogen as the reaction gas at 500° C., 28.2 gmol of the ethylene, 28.2 gmol of the nitrogen, and 84.7 gmol of the hydrogen were injected per one hour as the flow rate to the reactor through the gas distributor, respectively. And then, the temperature was controlled at 800° C. and then manipulated to synthesize the desired CNT.

As a result, 0.502 kg of CNT per one hour was produced in the reactor. The ethylene in the reaction gas was consumed by the reaction and the hydrogen was generated as the byproduct so that the composition of the mixed gas was changed, and then as the flow rate, 7.3 gmol of the etylene, 28.2 gmol of the nitrogen, and 126.5 gmol of the hydrogen were discharged from the reactor per one hour, respectively in the outlet part of the reactor.

And then, in order to secure the temperature of less than 50° C. that is the range capable of operating of the polymer membrane for the low temperature, the mixed gas and CNT discharged after cooling at 40 to 50° C. through the heat exchanger were separated through the cyclone; for the separated mixed gas, only hydrogen in a such amount that is generated as the byproduct in the reactor was selectively separated in the single polymer membrane (48 mm diameter, 27 inch length, hollow type polycarbonate membrane, the product available from IGS Company) and then re-circulated to the reactor supply pipe through the re-circulation pipe to significantly reduce 21 gmol per one hour of the amount of the ethylene gas that is lately supplied to the reactor.

Meanwhile, for the mixed gas re-circulated to the inlet of the reactor, it was confirmed that 7.2 gmol of the ethylene, 27.4 gmol of the nitrogen, and 84.7 gmol of the hydrogen were measured per one hour. The above values were shown that the original feed rate of the reaction gas was largely reduced as the rates of 26% of ethylene, 98% of nitrogen, and 99% of hydrogen as compared with the case of incineration of whole conventional discharging gas so that the production cost of desired CNT could be significantly reduced.

The following Table 1 shown the composition and flow rate of the mixed gas discharged from the reactor, and the following Table 2 shown the composition and flow rate of the mixed gas discharged from the polymer membrane.

TABLE 1

| Reactor Outlet Gas | | |
| --- | --- | --- |
| Amount of Reactor Discharging Gas | | 3.63 $Nm^3/h$ |
| Content in Supply Gas (%) | $H_2$ | 78.1 |
| | $C_2H_4$ | 4.5 |
| | $N_2$ | 17.4 |

TABLE 2

| Gas Separation Unit (Polymer Membrane) Outlet Gas | | |
| --- | --- | --- |
| Each Contents in Generation Gas (%) | $H_2$ | >98.6% (Hydrogen Recovery Rate 33.04%) |
| | Un-reacted $C_2H_4$ | ~0.2% |
| | Remained $N_2$ | ~1.2% |
| Flow of Product Gas Selectively Separated Through Separation Unit | | 0.96 $Nm^3/h$ |

Example 21

The same process with Example 20 was repeated, except that 26.2 gmol of the ethylene, 26.2 gmol of the nitrogen, and 104.7 gmol of the hydrogen per one hour as the flow rate were supplied to the reactor, respectively, as the reaction gas after preheating at 500° C., and the single polystyrene was used as the polymer membrane in the above Example 20.

As a result, it was confirmed that for the gas composition discharged from the reactor, 5.2 gmol of the ethylene, 26.2 gmol of the nitrogen, and 146.6 gmol of the hydrogen per one hour as the flow rate were discharged, respectively, and also for the composition of the mixed gas re-circulated to the inlet of the reactor, 5.1 gmol of the ethylene, 25.4 gmol of the nitrogen, and 104.7 gmol of the hydrogen per one hour as the flow rate were measured, respectively.

The above values were shown that the original feed rate of the reaction gas was largely reduced as the rates of 20% of ethylene, 98% of nitrogen, and 99% of hydrogen as compared with the case of incineration of whole conventional discharging gas so that the production cost of desired CNT could be significantly reduced.

The following Table 3 shown the composition and flow rate of the mixed gas discharged from the reactor, and the following Table 4 shown the composition and flow rate of the mixed gas discharged from the polymer membrane.

TABLE 3

| Reactor Outlet Gas | | |
| --- | --- | --- |
| Amount of Reactor Discharging Gas | | 3.99 Nm³/h |
| Content in Supply Gas (%) | $H_2$ | 82.4 |
| | $C_2H_4$ | 2.94 |
| | $N_2$ | 14.7 |

TABLE 4

| Gas Separation Unit (Polymer Membrane) Outlet Gas | | |
| --- | --- | --- |
| Each Contents in Generation Gas (%) | $H_2$ | >98.6% (Hydrogen Recovery Rate 33.04%) |
| | Un-reacted $C_2H_4$ | ~0.2% |
| | Remained $N_2$ | ~1.2% |
| Flow of Product Gas Selectively Separated Through Separation Unit | | 0.96 Nm³/h |

Example 22

The same process with Example 20 was repeated, except that 27.5 gmol of the ethylene, 27.5 gmol of the nitrogen, and 137.6 gmol of the hydrogen per one hour as the flow rate were supplied to the reactor, respectively, as the reaction gas after preheating at 500° C., and the single polyimide of hollow type was used as the polymer membrane in the above Example 20.

As a result, it was confirmed that for the gas composition discharged from the reactor, 6.6 gmol of the ethylene, 27.5 gmol of the nitrogen, and 179.4 gmol of the hydrogen per one hour as the flow rate were discharged, respectively, and also for the composition of the mixed gas re-circulated to the inlet of the reactor, 6.5 gmol of the ethylene, 26.7 gmol of the nitrogen, and 137.6 gmol of the hydrogen per one hour as the flow rate were measured, respectively.

The above values were shown that the original feed rate of the reaction gas was largely reduced as the rates of 24% of ethylene, 98% of nitrogen, and 99% of hydrogen as compared with the case of incineration of whole conventional discharging gas so that the production cost of desired CNT could be significantly reduced.

The following Table 5 shown the composition and flow rate of the mixed gas discharged from the reactor, and the following Table 6 shown the composition and flow rate of the mixed gas discharged from the polymer membrane.

TABLE 5

| Reactor Outlet Gas | | |
| --- | --- | --- |
| Amount of Reactor Discharging Gas | | 4.78 Nm³/h |
| Content in Supply Gas (%) | $H_2$ | 84.02 |
| | $C_2H_4$ | 3.1 |
| | $N_2$ | 12.9 |

TABLE 6

| Gas Separation Unit (Polymer Membrane) Outlet Gas | | |
| --- | --- | --- |
| Each Contents in Generation Gas (%) | $H_2$ | >98.6% (Hydrogen Recovery Rate 23.3%) |
| | Un-reacted $C_2H_4$ | ~0.2% |
| | Remained $N_2$ | ~1.2% |
| Flow of Product Gas Selectively Separated Through Separation Unit | | 0.96 Nm³/h |

Comparative Example 1

The same method with the above Example 2 was performed, except that 100% of the mixed gas separated by the cyclone in the above Example 2 was re-circulated without passing through the polymer membrane, the distributor, and the like, and only ethylene ($C_2H_4$) corresponding to 85% of initial amount injected to the reaction gas supply pipe was added.

The continuous operation was tried in the reaction, but 2 mole of hydrogen ($H_2$) produced as the byproduct of the reaction per 1 mole of ethylene was continuously accumulated in the reactor so that the pressure in the reactor was increased; made it difficult to smoothly inject $C_2H_4$; and hence the stable operation could not be possible within 20 minutes.

Comparative Example 2

The same method with the above Example 2 was performed, except that all of the polymer membrane and re-circulation pipe were omitted and the same composition and content of the reaction gas was continuously supplied to the reactor in the above Example 2.

The reaction had a significantly high cost of CNT production because the consumption level of ethylene was 3~7 times higher and the consumption level of nitrogen was 80~100 times higher, and the consumption level of hydrogen was at least 100 times higher than these of the above Example 2.

After one-hour reaction, CNT collected in the CNT collector had a yield of 840% and a conversion rate of 80% based on catalyst input, and the average external diameter of CNT obtained was 30 nm.

Test Example

The reaction condition, the conversion rate of the carbon source, and CNT yield of the above Examples 1 to 19 were measured as the following methods, and the results were shown in the following Table 7 and Table 8.

Conversion Rate of Carbon Source (%):

an injecting amount of ethylene gas to the reactor and a discharging amount of ethylene gas from the outlet of the reactor were measured by using Gas Chromatography and then the conversion rate was calculated as the following formula:

Conversion Rate of Carbon Source=(Flow of Ethylene Gas Injected to Reactor (gmol/hr)−Flow of Ethylene Discharged from Reactor (gmol/hr))×100/Flow of Ethylene Injected to Reactor (gmol/hr)

Gas Separation Efficiency (%):

The compositions at a front end and a back end of the membrane were measured by using Gas Chromatography and the separation efficiency was calculated based on the following formula:

Gas Separation Efficiency (%)=Gas Flow filtration-removed by Polymer Membrane (gmol/hr)×100/Gas Flow flowed to Polymer Membrane (gmol/hr)

CNT Yield (%):

A weight of catalyst was subtracted from a weight of CNT amount collected after the reaction by using a precise electronic scale, and then the catalyst yield was calculated based on the following formula:

Catalyst Yield (%)=(Total Weight of Carbon Product Recovered (g)−Mass of Catalyst (g))×100/Mass of Catalyst (g)

TABLE 7

| Example | Reactor Type | Catalyst | Catalyst Use Amount | Gas Supplying Composition $C_2H_4$ | $H_2$ | $N_2$ | Supply Velocity (ml/min) | $H_2$ Gas Separation Efficiency (%) | $C_2H_4$ Conversion Rate (%) | CNT Yield (%) |
|---|---|---|---|---|---|---|---|---|---|---|
| 1 | FBR | CoMo/ | 5 g | 1 | 1 | 1 | 3000 | 20 | 90 | 950 |
| 2 | | $Al^2O_3$ | 5 g | 1 | 2 | 1 | 3000 | 33 | 98.7 | 1020 |
| 3 | | | 5 g | 1 | 3 | 1 | 3000 | 28 | 98.4 | 780 |
| 4 | | | 5 g | 1 | 4 | 1 | 3000 | 24 | 98 | 630 |
| 5 | | | 5 g | 1 | 5 | 1 | 3000 | 20 | 98.2 | 580 |
| 6 | Rotary klin type | CoMo/ $Al^2O_3$ | 3 g | 1 | 2 | 1 | 1500 | 35 | 98.5 | 870 |
| 7 | | | 3 g | 1 | 3 | 1 | 1500 | 29 | 98.2 | 700 |
| 8 | FBR | CoMo/ | 5 g | 1 | 2 | 1 | 3000 | 34 | 98 | 1060 |
| 9 | | MgO | 5 g | 1 | 3 | 1 | 3000 | 29 | 99 | 810 |
| 10 | | | 5 g | 1 | 4 | 1 | 3000 | 24 | 98.5 | 670 |
| 11 | Rotary klin type | CoMo/ MgO | 3 g | 1 | 2 | 1 | 1500 | 36 | 99.2 | 860 |
| 12 | | | 3 g | 1 | 3 | 1 | 1500 | 29 | 99 | 690 |
| 13 | | | 3 g | 1 | 4 | 1 | 1500 | 24 | 98 | 570 |
| 14 | FBR | FeMo/ | 5 g | 1 | 2 | 1 | 3000 | 31 | 98.4 | 930 |
| 15 | | $SiO_2$ | 5 g | 1 | 3 | 1 | 3000 | 24 | 98.3 | 790 |
| 16 | | | 5 g | 1 | 4 | 1 | 3000 | 21 | 98 | 600 |
| 17 | Rotary klin type | FeMo/ $SiO_2$ | 3 g | 1 | 2 | 1 | 1500 | 35 | 99 | 860 |
| 18 | | | 3 g | 1 | 3 | 1 | 1500 | 29 | 99.2 | 680 |
| 19 | | | 3 g | 1 | 4 | 1 | 1500 | 24 | 98.5 | 550 |

TABLE 8

| Com. Example | Reactor Type | Catalyst | Catalyst Use Amount | Gas Supplying Composition $C_2H_4$ | $H_2$ | $N_2$ | Supply Velocity (ml/min) | $H_2$ Gas Separation Efficiency (%) | $C_2H_4$ Conversion Rate (%) | CNT Yield (%) |
|---|---|---|---|---|---|---|---|---|---|---|
| 1 | FBR | CoMo/$Al^2O_3$ | 5 g | 1 | 2 | 1 | 3000 | Gas Separation NA | — | — |
| 2 | | | 5 g | 1 | 2 | 1 | 3000 | Gas Separation-NA | 80 | 80 |

As shown in the above each of Examples, Table 7 and Table 8, it could be confirmed that the CNT manufacturing apparatus and method according to the present invention (Examples 1 to 19) had excellent conversion rate and also excellent CNT yield so that the cost of production could be significantly reduced and was an environmentally friendly way because a waste gas was not be generated.

Furthermore, it could be also confirmed that Examples 20 to 22 that use the single polymer membrane of hollow type allow separating effectively through controlling the pressure and input amount even if using single membrane when the polymer membrane itself has high separation efficiency.

The invention claimed is:

1. A continuous manufacturing method of a carbon nanotube, comprising:
   i) producing the carbon nanotube by providing and reacting a reaction gas including a carbon source, a reducing gas, and an inert gas with a catalyst, and cooling the produced carbon nanotube to a range of 40 to 50° C. in a heat exchanger, wherein the reaction gas, the reducing gas, and the inert gas comprise a mixed gas;
   ii) separating the mixed gas from the carbon nanotube, thereby producing a separated mixed gas;
   iii) filtering the separated mixed gas at a temperature of below 50° C. with a gas separation unit including more than one polymer membrane to remove at least some of the reducing gas, thereby producing a filtered mixed gas comprising the carbon source, wherein at least one of the more than one polymer membrane comprises one or more polymers selected from the group consisting of polysulfone, polycarbonate, polyimide, and polystyrene; and
   iv) recirculating the filtered mixed gas to the step i).

2. The continuous manufacturing method of the carbon nanotube according to claim 1, further comprising:
   v) producing additional carbon nanotubes by providing and reacting a reaction gas including carbon source from the recirculated filtered mix gas of the step iv), the reducing gas, and the inert gas with a catalyst.

3. The continuous manufacturing method of the carbon nanotube according to claim 1, wherein the mole ratio of the carbon source to the reducing gas in the step i) is 1:0.5 to 1:10.

4. The continuous manufacturing method of the carbon nanotube according to claim 2, wherein the amount of the reducing gas removed in the step iii) is the same as the amount provided in the reaction of the step v).

5. The continuous manufacturing method of the carbon nanotube according to claim 1, wherein the continuous manufacturing method excludes any step of incinerating waste gas.

* * * * *